United States Patent
Tezuka et al.

(10) Patent No.: US 8,830,480 B2
(45) Date of Patent: Sep. 9, 2014

(54) MEASUREMENT APPARATUS

(75) Inventors: Taro Tezuka, Utsunomiya (JP);
Yoshiyuki Kuramoto, Utsunomiya (JP);
Yusuke Koda, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 469 days.

(21) Appl. No.: 13/289,561

(22) Filed: Nov. 4, 2011

(65) Prior Publication Data
US 2012/0116718 A1  May 10, 2012

(30) Foreign Application Priority Data

Nov. 10, 2010  (JP) .................................. 2010-252209

(51) Int. Cl.
*G01B 9/02*  (2006.01)
(52) U.S. Cl.
CPC ........ *G01B 9/02005* (2013.01); *G01B 9/02067* (2013.01); *G01B 9/02076* (2013.01); *G01B 9/0207* (2013.01); *G01B 9/02003* (2013.01)
USPC ...................................................... 356/486
(58) Field of Classification Search
CPC ........ G01J 9/02; G01B 9/02005; G01B 11/14
USPC .......................................... 356/493, 498, 486
See application file for complete search history.

(56) References Cited

U.S. PATENT DOCUMENTS

| | | | |
|---|---|---|---|
| 5,106,191 A | 4/1992 | Ohtsuka | |
| 5,907,404 A * | 5/1999 | Marron et al. | 356/489 |
| 2002/0162954 A1 * | 11/2002 | Joukawa et al. | 250/231.13 |

FOREIGN PATENT DOCUMENTS

| | | |
|---|---|---|
| JP | 62135703 A | 6/1987 |
| JP | 03-9202 A | 1/1991 |
| JP | 6-52166 B2 | 7/1994 |
| JP | 2808136 B2 | 7/1998 |
| JP | 2002-323309 A | 11/2002 |
| JP | 2010-230653 A | 10/2010 |

OTHER PUBLICATIONS

Japanese Office Action for corresponding JP 2010-252209, mail dated Mar. 7, 2014.

* cited by examiner

*Primary Examiner* — Jonathan Hansen
(74) *Attorney, Agent, or Firm* — Rossi, Kimms & McDowell LLP

(57) ABSTRACT

The present invention provides a measurement apparatus which measures a distance between a reference surface and a surface to be measured, including a wavelength reference element configured to include a gas cell in which a plurality of types of gases having absorption lines different from each other are sealed, and a processing unit configured to set a wavelength of light emitted by a light source to a plurality of different wavelengths corresponding to a plurality of different absorption lines by using the wavelength reference element, control a phase detection unit to detect a phase corresponding to an optical path length between the reference surface and the surface to be measured for each of the plurality of different wavelengths, and perform processing of obtaining the distance.

8 Claims, 6 Drawing Sheets

MEASUREMENT APPARATUS

BACKGROUND OF THE INVENTION

1. Field of the Invention

The present invention relates to a measurement apparatus which measures the distance between a reference surface and a surface to be measured.

2. Description of the Related Art

A light wave interference measurement apparatus using a multi-wavelength light source is known as an apparatus which measures the distance between a reference surface and a surface to be measured (see Japanese Patent Laid-Open No. 62-135703 and Japanese Patent No. 2808136). This measurement apparatus needs to selectively increase the number of wavelengths to widen the length measurement range. For example, to obtain a length measurement range of about 1 m with a near infrared light source, four wavelengths need to be used. Japanese Patent No. 2808136 proposes a technique of decreasing the number of light sources by changing the wavelength by current modulation of an optical communication semiconductor laser in order to suppress complication and cost rise of the measurement apparatus caused by the increase in the number of wavelengths. Also, a wavelength scanning light wave interference measurement apparatus which continuously scans the wavelength of a light source is known as an apparatus which measures the distance between a reference surface and a surface to be measured (see Japanese Patent Publication No. 06-052166).

In this measurement apparatus, the guaranteed accuracy of the wavelength of the light source is a factor of the length measurement accuracy (measurement accuracy). To measure the distance at high accuracy, the wavelength of the light source needs to be guaranteed at high accuracy. From this, the techniques in Japanese Patent No. 2808136 and Japanese Patent Publication No. 06-052166 guarantee the wavelength of the light source using a wavelength reference such as an etalon or gas cell (that is, the guaranteed accuracy of the wavelength of the light source is increased).

However, in wavelength guarantee using an etalon disclosed in Japanese Patent No. 2808136, the transmittance peak of the etalon is sensitive to an environmental change. Thus, it is difficult to guarantee the wavelength at high accuracy for a long period. Also, in wavelength guarantee using a gas cell disclosed in Japanese Patent No. 2808136, the minimum wavelength interval of the light source cannot be set equal to or smaller than the absorption line interval of gas. It is therefore difficult to satisfactorily ensure the length measurement range (that is, measure the distance in a wide range). For example, the absorption line interval of acetylene gas used as a wavelength reference in the optical communication band is about 500 pm. In this case, the distance can be measured only within the range of about 2.4 mm.

The wavelength scanning measurement apparatus disclosed in Japanese Patent Publication No. 06-052166 needs to increase the wavelength scanning amount in order to measure the distance at high accuracy. This measurement apparatus cannot use a low-cost light source such as a semiconductor laser, raising the cost of the light source.

SUMMARY OF THE INVENTION

The present invention provides a technique capable of measuring the distance between a reference surface and a surface to be measured in a wide range at high accuracy.

According to one aspect of the present invention, there is provided a measurement apparatus which measures a distance between a reference surface and a surface to be measured, including a wavelength reference element configured to include a gas cell in which a plurality of types of gases having absorption lines different from each other are sealed, a light splitting element configured to split light emitted by a light source into a first light beam and a second light beam, and cause the first light beam to enter the reference surface and the second light beam to enter the surface to be measured, a phase detection unit configured to detect interference light between the first light beam reflected by the reference surface and the second light beam reflected by the surface to be measured, and detect, from a signal of the interference light, a phase corresponding to an optical path length between the reference surface and the surface to be measured, and a processing unit configured to set a wavelength of light emitted by the light source to a plurality of different wavelengths corresponding to a plurality of different absorption lines by using the wavelength reference element, control the phase detection unit to detect a phase corresponding to the optical path length between the reference surface and the surface to be measured for each of the plurality of different wavelengths, and perform processing of obtaining the distance.

Further aspects of the present invention will become apparent from the following description of exemplary embodiments with reference to the attached drawings.

DESCRIPTION OF THE EMBODIMENTS

Figure 1:
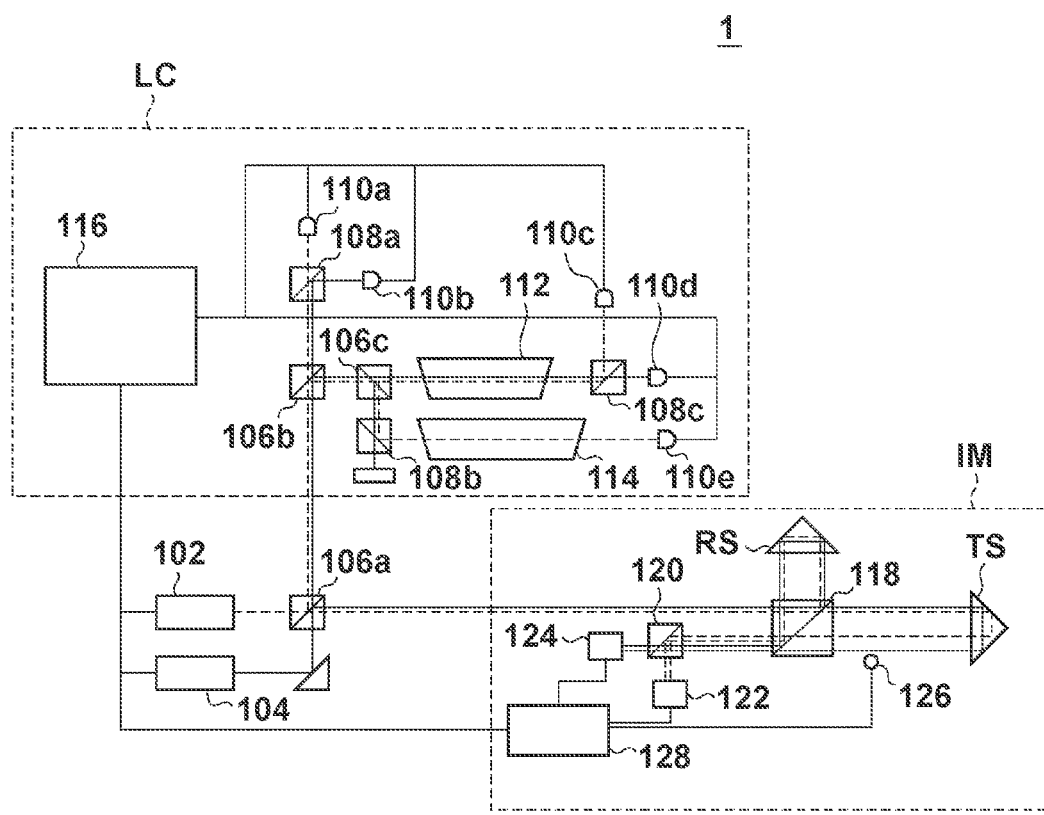
FIG. 1 is a schematic view showing the arrangement of a measurement apparatus in the first embodiment of the present invention.

Preferred embodiments of the present invention will be described below with reference to the accompanying drawings. Note that the same reference numerals denote the same members throughout the drawings, and a repetitive description thereof will not be given.

First Embodiment

FIG. 1 is a schematic view showing the arrangement of a measurement apparatus 1 in the first embodiment of the present invention. The measurement apparatus 1 is a light wave interference measurement apparatus which measures the distance between a reference surface and a surface to be measured. Note that the distance to be measured is an absolute value between a reference surface and a surface to be measured, and will also be called an absolute distance in this specification. As shown in FIG. 1, the measurement apparatus 1 includes a first light source 102 serving as a wavelength variable light source, a second light source 104 serving as a fixed wavelength light source, beam splitters 106a, 106b, and 106c, and spectral elements 108a, 108b, and 108c. The measurement apparatus 1 also includes light quantity detection units 110a, 110b, 110c, 110d, and 110e, a first gas cell 112, a second gas cell 114, a wavelength control unit 116, a beam splitter 118 serving as a light splitting element, and a spectral element 120. Further, the measurement apparatus 1 includes phase detection units 122 and 124, an environment detection unit 126, and a processing unit 128. Note that the beam splitters 106b and 106c, spectral elements 108a to 108c, light quantity detection units 110a to 110e, first gas cell 112, second gas cell 114, and wavelength control unit 116 form a light source control system LC. The beam splitter 118, spectral element 120, phase detection units 122 and 124, environment detection unit 126, and processing unit 128 form an interference measurement system IM.

Each of light emitted by the first light source 102 and light emitted by the second light source 104 is guided to the light source control system LC and interference measurement system IM via the beam splitter 106a (that is, split into two light beams by the beam splitter 106a).

In the embodiment, easily and inexpensively available distributed feedback (DFB) semiconductor lasers mass-produced for optical communication are used as the first light source 102 and second light source 104. The DFB semiconductor laser can continuously change the wavelength by modulating the driving current. Note that the first light source 102 and second light source 104 are not limited to DFB semiconductor lasers, and may be external cavity semiconductor lasers, fiber lasers, or the like.

The light beam guided to the light source control system LC is guided to the spectral element 108a and beam splitter 106c via the beam splitter 106b (that is, split into two light beams by the beam splitter 106b).

The light beam guided to the spectral element 108a is separated (branched) into the light emitted by the first light source 102 and that emitted by the second light source 104. The light quantity detection units 110a and 110b detect the respective light quantities. The spectral element 108a is formed from, for example, a dichroic mirror. However, the spectral element 108a is not limited to a dichroic mirror, and may be formed from a prism, bulk diffraction grating, array waveguide diffraction grating, or the like. A proper element can be selected based on a necessary wavelength resolution and cost.

The light beam guided to the beam splitter 106c is split into two light beams, which are guided to the first gas cell 112 and spectral element 108b, respectively. The light beam guided to the first gas cell 112 is separated into the light emitted by the first light source 102 and that emitted by the second light source 104 via the spectral element 108c, which are guided to the light quantity detection units 110c and 110d, respectively. The light beam guided to the spectral element 108b is separated into the light emitted by the first light source 102 and that emitted by the second light source 104. The light emitted by the first light source 102 is guided to the second gas cell 114. Hence, the light emitted by the first light source 102 parallelly passes (is transmitted) through the first gas cell 112 and second gas cell 114, and its light quantity is detected by the light quantity detection units 110c and 110e. Also, the light emitted by the second light source 104 passes (is transmitted) through the first gas cell 112, and its light quantity is detected by the light quantity detection unit 110d.

Different types of gases are sealed in the first gas cell 112. In the embodiment, a gas mixture of $^{12}C_2H_2$ gas and $^{13}C_2H_2$ gas is sealed in the first gas cell 112. However, gases sealed in the first gas cell 112 are not limited to them. For example, at least two of acetylene, an acetylene isotope, hydrogen cyanide, and a hydrogen cyanide isotope may be sealed in the first gas cell 112. A single type of gas is sealed in the second gas cell 114. In the embodiment, $H^{12}C^{14}N$ gas is sealed in the second gas cell 114.

Based on the light quantities detected by the light quantity detection units 110a to 110e, the wavelength control unit 116 controls the wavelength of light emitted by the first light source 102 and that of light emitted by the second light source 104 (that is, stabilizes the wavelengths). For example, the wavelength control unit 116 modulates the temperatures of the first light source 102 and second light source 104 or modulates currents to be supplied to the first light source 102 and second light source 104, thereby controlling the wavelength of light emitted by the first light source 102 and that of light emitted by the second light source 104. In the embodiment, the wavelength control unit 116 controls the wavelength of light emitted by the first light source 102 to be three different wavelengths, that is, a first reference wavelength $\lambda_1$, second reference wavelength $\lambda_2$, and third reference wavelength $\lambda_3$. The wavelength control unit 116 controls the wavelength of light emitted by the second light source 104 to be a fourth reference wavelength $\lambda_4$.

The light beam guided to the interference measurement system IM is guided to a reference surface RS and a surface TS to be measured via the beam splitter 118 (that is, split into two light beams (first and second light beams) by the beam splitter 118). The reference surface RS is formed from a cube corner reflector having a plurality of reflecting surfaces. Together with the beam splitter 118, the reference surface RS is fixed to a reference structure serving as the reference of distance measurement. Similar to the reference surface RS, the surface TS to be measured is formed from a cube corner reflector and fixed to a distance measurement target object (object to be measured).

The light beam (reference light) reflected by the reference surface RS and the light beam (light to be measured) reflected by the surface TS to be measured are merged by the beam splitter 118 (that is, serve as interference light). The light enters the spectral element 120. The light which has entered the spectral element 120 is separated (branched) into the light emitted by the first light source 102 and that emitted by the second light source 104, which are guided to the phase detection units 122 and 124, respectively.

The phase detection units 122 and 124 detect the interference light between the reference light and the light to be measured and acquire, from the interference light signal, phases containing position information of the reference surface and the surface to be measured. In the embodiment, the phase detection unit 122 detects a phase corresponding to the optical path length between the reference surface RS and the surface TS to be measured for the wavelength of light emitted by the first light source 102, that is, each of the first reference wavelength $\lambda_1$, second reference wavelength $\lambda_2$, and third reference wavelength $\lambda_3$. The phase detection unit 124 detects a phase corresponding to the optical path length between the reference surface RS and the surface TS to be measured for the wavelength of light emitted by the second light source 104, that is, the fourth reference wavelength $\lambda_4$.

The environment detection unit 126 is arranged near the surface TS to be measured, and measures an environment near the surface TS to be measured, that is, in a space between the reference surface RS and the surface TS to be measured. The environment detection unit 126 includes, for example, a thermometer for detecting the temperature of gas in the space between the reference surface RS and the surface TS to be measured, and a barometer for detecting an atmospheric pressure in the space between the reference surface RS and the surface TS to be measured. The environment detection unit 126 detects a group index in the space (that is, atmosphere) between the reference surface RS and the surface TS to be measured.

The processing unit 128 performs processing of obtaining the absolute distance between the reference surface RS and the surface TS to be measured by using the phases detected by the phase detection units 122 and 124 and the refractive index detected by the environment detection unit 126. The processing unit 128 controls the wavelength of light emitted by the first light source 102 and that of light emitted by the second light source 104 via the wavelength control unit 116.

Figure 2:
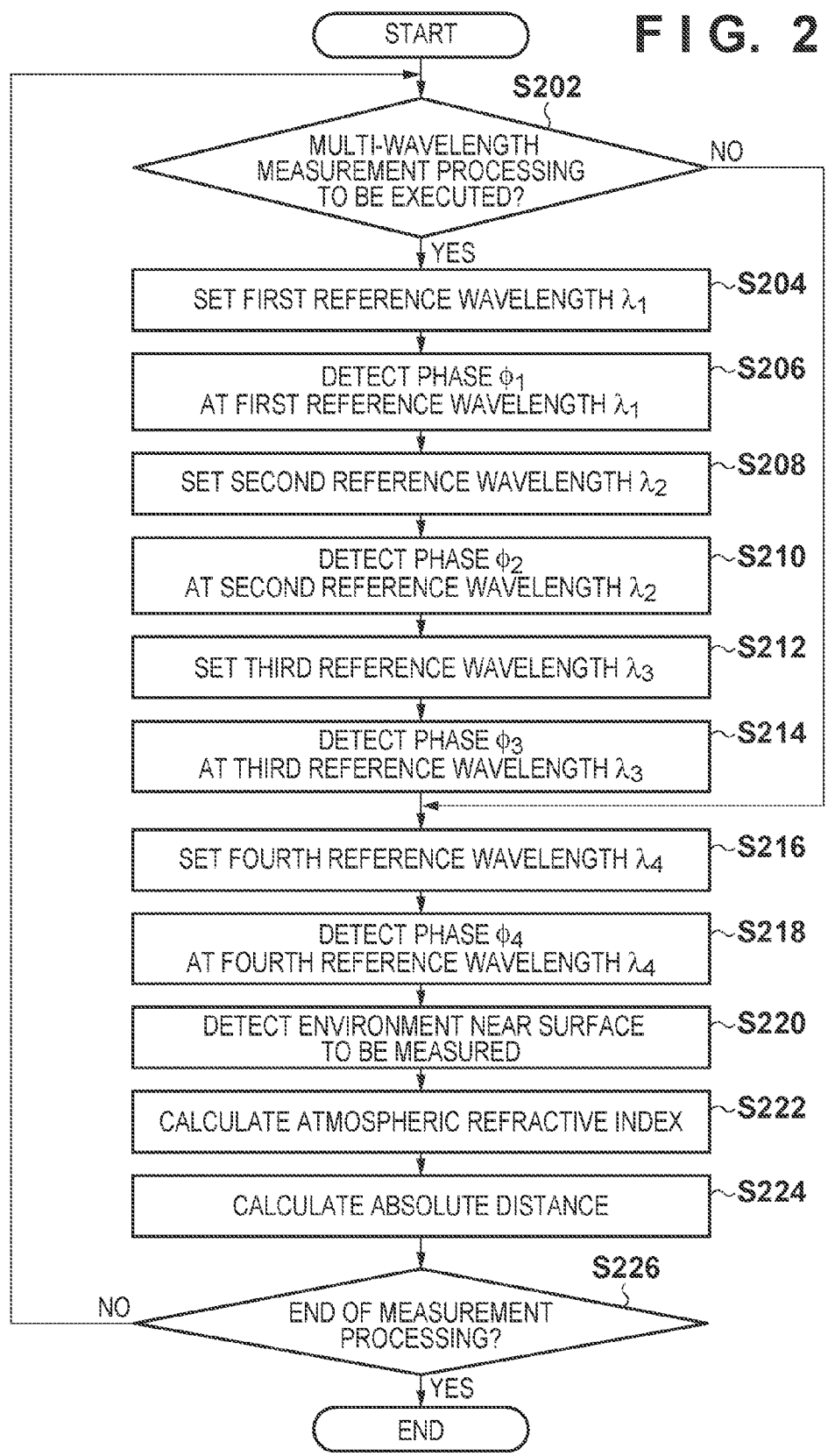
FIG. 2 is a flowchart for explaining measurement processing in the measurement apparatus shown in FIG. 1.

Measurement processing (that is, processing of obtaining the absolute distance between the reference surface RS and the surface TS to be measured by the processing unit 128) in the measurement apparatus 1 will be explained with reference to FIG. 2. The measurement processing in the measurement apparatus 1 is divided into multi-wavelength measurement processing in steps S204 to S214 and relative distance measurement processing in steps S216 to S224.

In step S202, it is determined whether to execute multi-wavelength measurement processing. For example, immediately after the start of absolute distance measurement or when the past phase detection history is lost by, for example, shielding light from the second light source 104, multi-wavelength measurement processing needs to be executed. Note that the processing unit 128 automatically determines whether to execute multi-wavelength measurement processing. If it is determined to execute multi-wavelength measurement processing, the process shifts to step S204. If it is determined not to execute multi-wavelength measurement processing, the process shifts to step S216.

Figure 3:
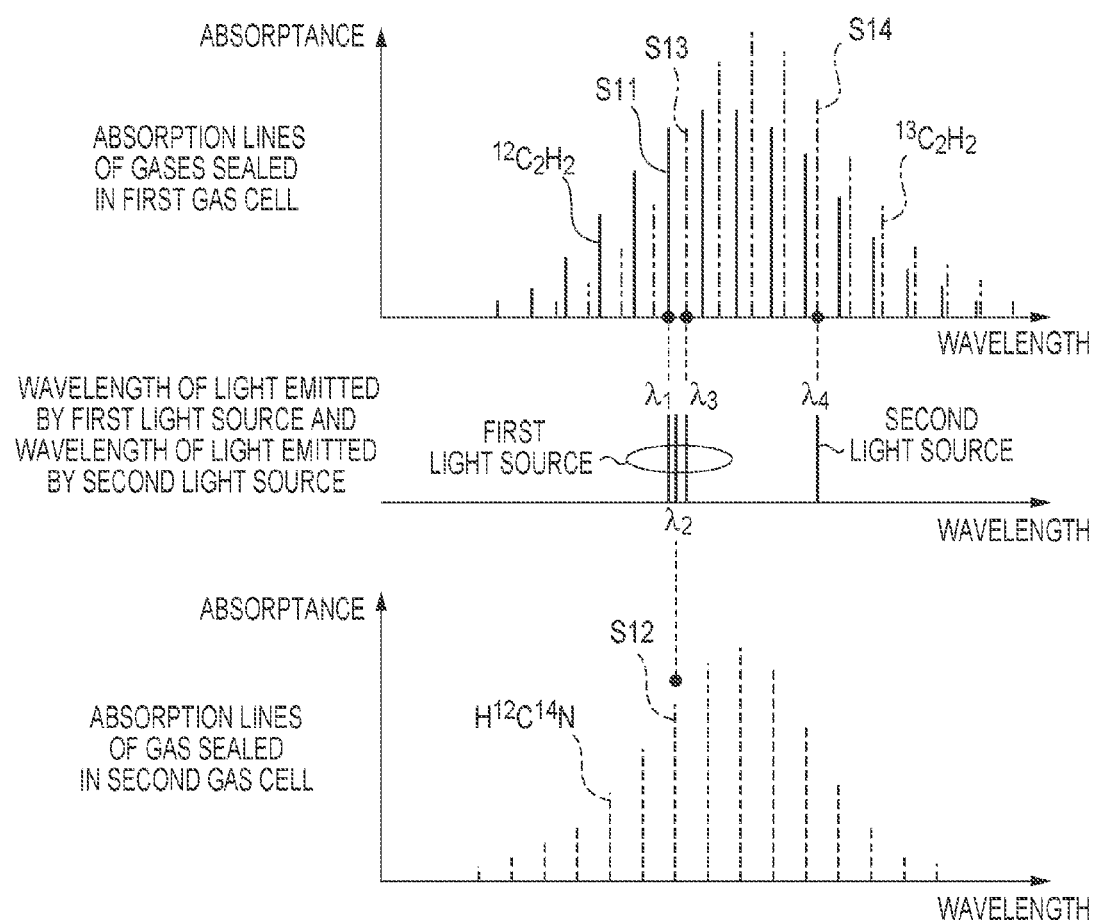
FIG. 3 is a graph showing the relationship between the absorption lines of gases respectively sealed in the first and second gas cells and the first to fourth reference wavelengths.

In step S204, the wavelength of light emitted by the first light source 102 is set to the first reference wavelength $\lambda_1$ (that is, wavelength stabilization control at the first reference wavelength $\lambda_1$ starts). In the embodiment, as shown in FIG. 3, a wavelength corresponding to the absorption line S11 of $^{12}C_2H_2$ gas sealed in the first gas cell 112 is set as the first reference wavelength $\lambda_1$, and the wavelength of light emitted by the first light source 102 is stabilized. More specifically, the absorption line S11 is specified from a change of a light quantity detected by the light quantity detection unit 110c upon scanning the wavelength of light emitted by the first light source 102. The wavelength of light emitted by the first light source 102 is controlled (adjusted) so that the ratio of a light quantity detected by the light quantity detection unit 110a and that detected by the light quantity detection unit 110c becomes constant at the tail of the absorption line S11. Note that the wavelength of light emitted by the light source may be stabilized to the center wavelength of the absorption line using light frequency-modulated by an electro-optical modulator.

In step S206, a phase $\phi_1$ at the first reference wavelength $\lambda_1$ is detected. Detecting a phase means detecting the phase of interference light between reference light and light to be measured. Phase detection by the phase detection unit 122 can adopt a technique known to those skilled in the art, such as a technique of spatially splitting a light wave into three and detecting, by three sensors, the light beams to which a phase difference of $2\pi/3$ is given using a polarizer.

In step S208, the wavelength of light emitted by the first light source 102 is set to the second reference wavelength $\lambda_2$ (that is, wavelength stabilization control at the second reference wavelength $\lambda_2$ starts). In the embodiment, as shown in FIG. 3, a wavelength corresponding to the absorption line S12 of $H^{12}C^{14}N$ gas sealed in the second gas cell 114 is set as the second reference wavelength $\lambda_2$, and the wavelength of light emitted by the first light source 102 is stabilized. Note that wavelength stabilization control at the second reference wavelength $\lambda_2$ is the same as that in step S204 except that the second gas cell 114 and light quantity detection unit 110e are used, and a detailed description thereof will not be repeated.

In step S210, a phase $\phi_2$ at the second reference wavelength $\lambda_2$ is detected. Note that detection of the phase $\phi_2$ at the second reference wavelength $\lambda_2$ is the same as that in step S206, and a detailed description thereof will not be repeated.

In step S212, similar to step S204, the wavelength of light emitted by the first light source 102 is set to the third reference wavelength $\lambda_3$ (that is, wavelength stabilization control at the third reference wavelength $\lambda_3$ starts). In the embodiment, as shown in FIG. 3, a wavelength corresponding to the absorption line S13 of $^{13}C_2H_2$ gas sealed in the first gas cell 112 is set as the third reference wavelength $\lambda_2$, and the wavelength of light emitted by the first light source 102 is stabilized.

In step S214, similar to step S206, a phase $\phi_3$ at the third reference wavelength $\lambda_3$ is detected.

In step S216, the wavelength of light emitted by the second light source 104 is set to the fourth reference wavelength $\lambda_4$ (that is, wavelength stabilization control at the fourth reference wavelength $\lambda_4$ starts). In the embodiment, as shown in FIG. 3, a wavelength corresponding to the absorption line S14 of $^{13}C_2H_2$ gas sealed in the first gas cell 112 is set as the fourth reference wavelength $\lambda_4$, and the wavelength of light emitted by the second light source 104 is stabilized. Note that wavelength stabilization control at the fourth reference wavelength $\lambda_4$ is the same as that in step S204, and a detailed description thereof will not be repeated.

In step S218, a phase $\phi_4$ at the fourth reference wavelength $\lambda_4$ is detected. Note that detection of the phase $\phi_4$ at the fourth reference wavelength $\lambda_4$ is the same as that in step S206 except that the phase detection unit 124 is used, and a detailed description thereof will not be repeated.

The embodiment employs a DFB semiconductor laser as the second light source 104, similar to the first light source 102. This can make common wavelength stabilization control in step S216 and those in steps S204, S208, and S212. Similarly, phase detection in step S218 and those in steps S206, S210, and S214 can also be made common.

The conditions of the respective reference wavelengths for measuring an absolute distance in multi-wavelength interference measurement using four reference wavelengths (first reference wavelength $\lambda_1$ to fourth reference wavelength $\lambda_4$), and details of the first gas cell 112 and second gas cell 114 will be explained.

The embodiment assumes that the first reference wavelength $\lambda_1$ to fourth reference wavelength $\lambda_4$ satisfy inequalities of $\lambda_1 < \lambda_2 < \lambda_3 < \lambda_4$ and $\Delta\lambda_{12} < \Delta\lambda_{23} < \Delta\lambda_{34}$. Note that $\Delta\lambda_{12}$, $\Delta\lambda_{23}$, and $\Delta\lambda_{34}$ are $\Delta\lambda_{12} = |\lambda_2 - \lambda_1|$, $\Delta\lambda_{23} = |\lambda_3 - \lambda_2|$, and $\Delta\lambda_{34} = |\lambda_4 - \lambda_3|$, respectively.

The synthetic wavelength of the first reference wavelength $\lambda_1$ and second reference wavelength $\lambda_2$ represented by $\lambda_1 \cdot \lambda_2 / |\lambda_2 - \lambda_1|$ is defined as $\Lambda_{12}$. The synthetic wavelength of the second reference wavelength $\lambda_2$ and third reference wavelength $\lambda_3$ represented by $\lambda_2 \cdot \lambda_3 / |\lambda_3 - \lambda_2|$ is defined as $\Lambda_{23}$. The synthetic wavelength of the third reference wavelength $\lambda_3$ and fourth reference wavelength $\lambda_4$ represented by $\lambda_3 \cdot \lambda_4 / |\lambda_4 - \lambda_3|$ is defined as $\Lambda_{34}$. In multi-wavelength interference measurement, wavelengths need to be set (selected) so that the maximum wavelength $\Lambda_{12}$ and minimum wavelength $\Lambda_{34}$ out of the synthetic wavelengths $\Lambda_{12}$, $\Lambda_{23}$, and $\Lambda_{34}$ given by equations (1) satisfy conditional expressions given by inequalities (2) and (3):

$$\begin{cases} \Lambda_{12} = \dfrac{\lambda_1 \cdot \lambda_2}{|\lambda_2 - \lambda_1|} \\ \Lambda_{23} = \dfrac{\lambda_2 \cdot \lambda_3}{|\lambda_3 - \lambda_2|} \\ \Lambda_{34} = \dfrac{\lambda_3 \cdot \lambda_4}{|\lambda_4 - \lambda_3|} \end{cases} \quad (1)$$

$$\Lambda_{12} > 2d \quad (2)$$

$$\Lambda_{34} < \lambda_4 \quad (3)$$

where d is the maximum length measurement range of the measurement apparatus 1 (interference measurement system IM). Under the constraints of inequalities (2) and (3), the differences between the respective reference wavelengths need to be selected within the ranges of conditional expressions given by inequalities (4), (5), and (6):

$$d\phi^3 \cdot \lambda_1 < \Delta\lambda_{12} < \lambda_1 \cdot \left( \dfrac{2d}{2d - \lambda_1} - 1 \right) \quad (4)$$

$$d\phi^2 \cdot \lambda_2 < \Delta\lambda_{23} < \lambda_2 \cdot \left( \dfrac{\Lambda_{12} \cdot d\phi}{\Lambda_{12} \cdot d\phi - \lambda_2} - 1 \right) \quad (5)$$

$$d\phi \cdot \lambda_3 < \Delta\lambda_{34} < \lambda_3 \cdot \left( \dfrac{\Lambda_{23} \cdot d\phi}{\Lambda_{23} \cdot d\phi - \lambda_3} - 1 \right) \quad (6)$$

where $d\phi$ is the phase detection accuracy of the measurement apparatus 1 (phase detection units 122 and 124). In inequality (4), assuming that $\lambda$=1500 nm, d==1 m, and $d\phi$=$10^{-3}$ [wave], 1.5 fm<$\Delta\lambda_{12}$<1.1 pm holds. The interval between absorption lines (absorption line interval) of a gas such as acetylene gas or hydrogen cyanide which is a standard gas in the optical communication band is about 500 pm. When a gas cell filled with a single type of gas is used as a wavelength reference element, the above-mentioned wavelength difference cannot be obtained. To the contrary, when a gas cell filled with a plurality of types of gases is used as a wavelength reference element, the above-mentioned wavelength difference can be obtained by selecting proper absorption lines as the absorption lines S11 and S12 from the absorption lines of these gases.

In the embodiment, a 1526.8742-nm absorption line of $^{12}C_2H_2$ gas is set as the absorption line S11, and a 1526.8748-nm absorption line of $H^{12}C^{14}N$ gas is set as the absorption line S12, obtaining $\Delta\lambda_{12}$=0.6 pm. $\Delta\lambda_{12}$ is narrower than the line width (several pm) of the absorption line of each gas. When $^{12}C_2H_2$ gas and $H^{12}C^{14}N$ gas are sealed in a single gas cell, the absorption lines may overlap each other, decreasing the wavelength stabilization precision. To prevent this, $^{12}C_2H_2$ gas is sealed in the first gas cell 112 and $H^{12}C^{14}N$ gas is sealed in the second gas cell 114 in the embodiment. Further, $^{13}C_2H_2$ gas used in wavelength stabilization control at the third reference wavelength $\lambda_3$ and fourth reference wavelength $\lambda_4$ is also sealed in the first gas cell 112.

In wavelength stabilization control, absorption line spectra corresponding to the respective reference wavelengths are identical. For example, a comparison between the absorption lines S11 and S12 reveals that the intensity of the absorption line S12 is lower than that of the absorption line S11. In this case, the absorptance of the absorption line S11 and that of the absorption line S12 can be equalized by setting the second gas cell 114 longer than the first gas cell 112. The absorptance of the absorption line can also be adjusted by changing the pressure of the gas cell.

In inequality (5), when a wavelength corresponding to the absorption line S12 of $H^{12}C^{14}N$ gas is used as the second reference wavelength $\lambda_2$, the range of $\Delta\lambda_{23}$ is 1.5 pm<$\Delta\lambda_{23}$<600 pm. The current sensitivity of the DFB semiconductor laser is several pm/mA. By setting $\Delta\lambda_{23}$ to about several ten pm, the first reference wavelength $\lambda_1$ to third reference wavelength $\lambda_3$ can be obtained using a single light source (that is, the first light source 102).

In the embodiment, a 1526.9467-nm absorption line of $^{13}C_2H_2$ gas is set as the absorption line S13. As described above, $^{13}C_2H_2$ gas is mixed with $^{12}C_2H_2$ gas and sealed in the first gas cell 112. A comparison between the absorption lines S11 and S13 reveals that the intensity of the absorption line S13 is lower than that of the absorption line S11. In this case, the absorptance of the absorption line S11 and that of the absorption line S13 can be equalized by setting the partial pressure of $^{13}C_2H_2$ gas higher than that of $^{12}C_2H_2$ gas in the first gas cell 112.

In inequality (6), when a wavelength corresponding to the absorption line S13 of $^{13}C_2H_2$ gas is used as the third reference wavelength $\lambda_3$, the range of $\Delta\lambda_{34}$ is 1.5 nm<$\Delta\lambda_{34}$<75.4 nm. Since the range of $\Delta\lambda_{34}$ is much larger than the interval between absorption lines of a single type of gas, the selectivity of the absorption line S14 corresponding to the fourth reference wavelength $\lambda_4$ is wide. In the embodiment, a 1530.7388-nm absorption line of $^{13}C_2H_2$ gas is set as the absorption line S14.

As described above, in the embodiment, at least a gas having the first absorption line (for example, $^{12}C_2H_2$ gas) and a gas having the second absorption line (for example, $^{13}C_2H_2$ gas) are sealed in the first gas cell 112. Also, at least a gas having the third absorption line (for example, $H^{12}C^{14}N$ gas) is sealed in the second gas cell 114. The first absorption line (for example, the absorption line S11), the second absorption line (for example, the absorption line S13), and the third absorption line (for example, the absorption line S12) satisfy a relation of a wavelength corresponding to the first absorption line<a wavelength corresponding to the third absorption line<a wavelength corresponding to the second absorption line.

Note that wavelength stabilization control at the first reference wavelength $\lambda_1$ to third reference wavelength $\lambda_3$ and that at the fourth reference wavelength $\lambda_4$ are different not only in the light source but also in the light quantity detection unit and phase detection unit used for wavelength stabilization control. Hence, a phase can be detected using the second light source 104 stabilized at the fourth reference wavelength $\lambda_4$ independently of wavelength stabilization control at the first reference wavelength $\lambda_1$ to third reference wavelength $\lambda_3$. Relative distance measurement processing in steps S216 to S224 can always be performed.

Referring back to FIG. 2, in step S220, the environment near the surface TS to be measured, that is, in a space between the reference surface RS and the surface TS to be measured is detected. The embodiment assumes that the humidity in the space between the reference surface RS and the surface TS to be measured is guaranteed. The environment detection unit 126 detects the temperature t [° C.] and atmospheric pressure p [Pa] in this space, and inputs the detection results to the processing unit 128.

In step S222, atmospheric refractive indices $n_1$, $n_2$, $n_3$, and $n_4$ in the space between the reference surface RS and the surface TS to be measured are calculated for the first reference wavelength $\lambda_1$, second reference wavelength $\lambda_2$, third reference wavelength $\lambda_3$, and fourth reference wavelength $\lambda_4$, respectively. First, the atmospheric refractive index n of dry gas is calculated by equations (7) based on the Edlen equation using the temperature t [° C.] and atmospheric pressure p [Pa]:

$$\begin{cases} n(\lambda) = 1 + \dfrac{p \cdot 10^{-8}}{96095.43}\left[8342.54 + \dfrac{2406147}{130 - S(\lambda)} + \dfrac{15998}{38.9 - S(\lambda)}\right]\left[\dfrac{1 + 10^{-8}(0.601 - 0.00972t)p}{1 + 0.003661t}\right] \\ S(\lambda) = 1/(\lambda \cdot 10^6)^2 \end{cases} \quad (7)$$

Note that the gas in the space between the reference surface RS and the surface TS to be measured may not be dry. In this case, the environment detection unit 126 needs to include a hygrometer for detecting the humidity of the gas. An Edlen equation including a humidity correction term is used in place of equation (7). In a space in which the atmospheric environment is satisfactorily controlled by air conditioning or the like and the refractive index is considered to be stable (that is, the refractive index does not change), steps S220 and S222 can be skipped in the second and subsequent operations.

In step S224, the absolute distance D between the reference surface RS and the surface TS to be measured is calculated. More specifically, the absolute distance D is calculated by equation (8):

$$D = \dfrac{\lambda_{4v}}{2}\left(\text{round}\left(\dfrac{2D_{34}}{\lambda_{4v}} - \dfrac{\phi_4}{2\pi}\right) + \dfrac{\phi_4}{2\pi}\right) \quad (8)$$

Note that the following equations (9) to (18) define the respective variables in equation (8):

$$D_{34} = \dfrac{\Lambda_{34v}}{2}\left(\text{round}\left(\dfrac{2D_{23}}{\Lambda_{34v}} - \dfrac{\phi_3 - \phi_4}{2\pi}\right) + \dfrac{\phi_3 - \phi_4}{2\pi}\right) \quad (9)$$

$$D_{23} = \dfrac{\Lambda_{23v}}{2}\left(\text{round}\left(\dfrac{2D_{12}}{\Lambda_{23v}} - \dfrac{\phi_2 - \phi_3}{2\pi}\right) + \dfrac{\phi_2 - \phi_3}{2\pi}\right) \quad (10)$$

$$D_{12} = \dfrac{\Lambda_{12v}}{4\pi}(\phi_1 - \phi_2) \quad (11)$$

$$\Lambda_{12v} = \dfrac{\Lambda_{12}}{n_{12}} \quad (12)$$

$$\Lambda_{23v} = \dfrac{\Lambda_{23}}{n_{23}} \quad (13)$$

$$\Lambda_{34v} = \dfrac{\Lambda_{34}}{n_{34}} \quad (14)$$

$$\lambda_{4v} = \dfrac{\lambda_4}{n_4} \quad (15)$$

$$n_{12} = \dfrac{n_1 \cdot \lambda_2 - n_2 \cdot \lambda_1}{\lambda_2 - \lambda_1} \quad (16)$$

$$n_{23} = \dfrac{n_2 \cdot \lambda_3 - n_3 \cdot \lambda_2}{\lambda_3 - \lambda_2} \quad (17)$$

$$n_{34} = \dfrac{n_3 \cdot \lambda_4 - n_4 \cdot \lambda_{31}}{\lambda_4 - \lambda_3} \quad (18)$$

The left-hand sides of equations (9) to (11) correspond to length measurement distances calculated using the synthetic wavelengths $\Lambda_{34}$, $\Lambda_{23}$, and $\Lambda_{12}$. $\lambda_{4v}$, $\Lambda_{12v}$, $\Lambda_{23v}$, and $\Lambda_{34v}$ correspond to wavelengths in vacuum at $\lambda_4$, $\Lambda_{12}$, $\Lambda_{23}$, and $\Lambda_{34}$. $n_{12}$, $n_{23}$, and $n_{34}$ correspond to the group index for $\lambda_1$ and $\lambda_2$, that for $\lambda_2$ and $\lambda_3$, and that for $\lambda_3$ and $\lambda_4$, respectively. Round(A) is the function of rounding the argument A to an integer.

In step S226, it is determined whether to end the measurement processing (processing of obtaining the absolute distance between the reference surface RS and the surface TS to be measured). If it is determined to end the measurement processing, the measurement processing ends. If it is determined not to end the measurement processing, the process returns to step S202 to determine whether to execute multi-wavelength measurement processing. If it is determined not to execute multi-wavelength measurement processing, steps S204 to S214 are skipped, and steps S216 to S224 are executed. When steps S204 to S214 are skipped i times, the absolute distance D is calculated according to equation (19):

$$D(i) = D(0) + \sum_{i=1}^{n} \lambda_{4v}(i) \cdot \dfrac{\phi_4(i)}{2\pi} \quad (19)$$

where D(0) corresponds to the final absolute distance calculated in accordance with equation (8) after executing steps S204 to S224. Also, $\lambda_{4v}(i)$ and $\phi_4(i)$ correspond to the ith wavelength and phase of $\lambda_4$ in vacuum, respectively.

As described above, the measurement apparatus 1 according to the first embodiment can measure the absolute distance between the reference surface RS and the surface TS to be measured in a wide range at high accuracy.

Second Embodiment

Figure 4:
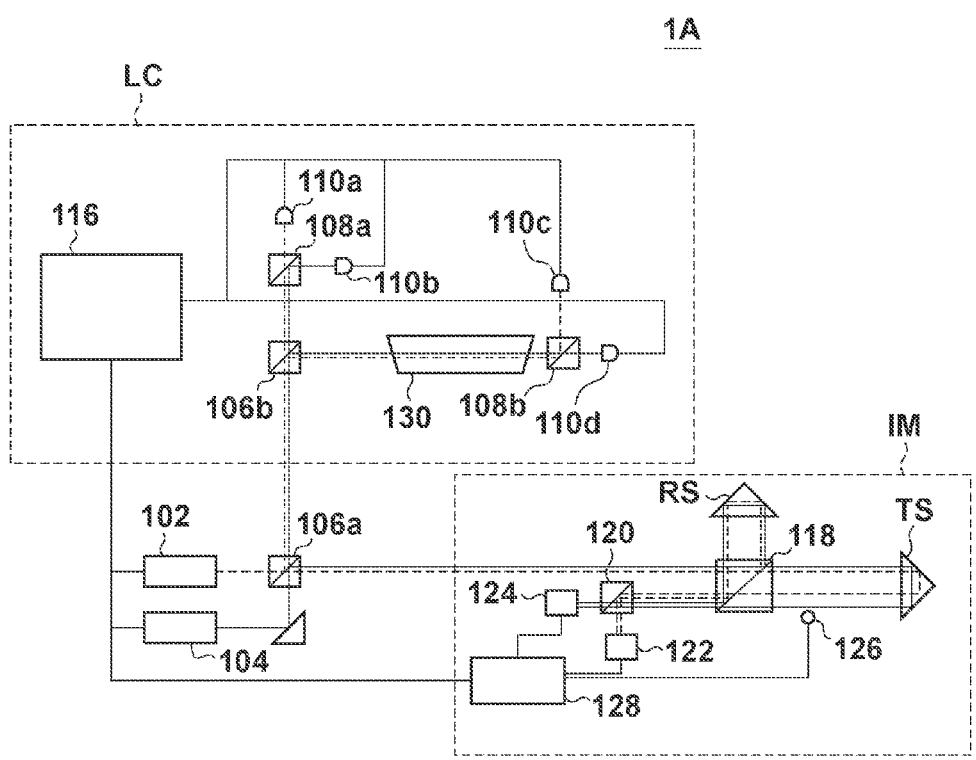
FIG. 4 is a schematic view showing the arrangement of a measurement apparatus in the second embodiment of the present invention.

FIG. 4 is a schematic view showing the arrangement of a measurement apparatus 1A in the second embodiment of the present invention. The measurement apparatus 1A differs from the measurement apparatus 1 in measurement processing of obtaining the absolute distance between the reference surface RS and the surface TS to be measured. The measurement apparatus 1A basically has the same arrangement as that of the measurement apparatus 1. However, the measurement apparatus 1A includes not two, first gas cell 112 and second gas cell 114 but one gas cell 130. The measurement apparatus 1A therefore has a simpler arrangement than that of the measurement apparatus 1. In the measurement apparatus 1A, a beam splitter 106b, spectral elements 108a and 108b, light quantity detection units 110a to 110d, the gas cell 130, and a wavelength control unit 116 form a light source control system LC. A beam splitter 118, a spectral element 120, phase detection units 122 and 124, an environment detection unit 126, and a processing unit 128 form an interference measurement system IM.

Each of light emitted by a first light source 102 and light emitted by a second light source 104 is guided to the light source control system LC and interference measurement system IM via a beam splitter 106a (that is, split into two light beams by the beam splitter 106a).

The light beam guided to the light source control system LC is guided to the spectral element 108a and gas cell 130 via the beam splitter 106b (that is, split into two light beams by the beam splitter 106b). The light beam guided to the spectral element 108a is separated (branched) into the light emitted by the first light source 102 and that emitted by the second light source 104. The light quantity detection units 110*a* and 110*b* detect the respective light quantities. The light beam guided to the gas cell 130 is separated into the light emitted by the first light source 102 and that emitted by the second light source 104 via the spectral element 108*b*, which are guided to the light quantity detection units 110*c* and 110*d*. Therefore, the light emitted by the first light source 102 and that emitted by the second light source 104 pass (are transmitted) through the gas cell 130, and their light quantities are detected by the light quantity detection units 110*c* and 110*d*.

Different types of gases are sealed in the gas cell 130. In the embodiment, a gas mixture of $^{12}C_2H_2$ gas and $^{13}C_2H_2$ gas is sealed in the gas cell 130.

Based on the light quantities detected by the light quantity detection units 110*a* to 110*d*, the wavelength control unit 116 controls the wavelength of light emitted by the first light source 102 and that of light emitted by the second light source 104 (that is, stabilizes the wavelengths). In the second embodiment, the wavelength control unit 116 controls the wavelength of light emitted by the first light source 102 to be two different wavelengths, that is, a first reference wavelength $\lambda_1$ and second reference wavelength $\lambda_2$. The wavelength control unit 116 controls the wavelength of light emitted by the second light source 104 to be a third reference wavelength $\lambda_3$.

To the contrary, the light beam guided to the interference measurement system IM is guided to a reference surface RS and a surface TS to be measured via the beam splitter 118 (that is, split into two light beams (first and second light beams) by the beam splitter 118).

The light beam (reference light) reflected by the reference surface RS and the light beam (light to be measured) reflected by the surface TS to be measured are merged by the beam splitter 118 (that is, serve as interference light). The light enters the spectral element 120. The light which has entered the spectral element 120 is separated (branched) into the light emitted by the first light source 102 and that emitted by the second light source 104, which are guided to the phase detection units 122 and 124, respectively.

The phase detection units 122 and 124 detect the interference light between the reference light and the light to be measured and acquire, from the interference light signal, phases containing position information of the reference surface and the surface to be measured. In the second embodiment, the phase detection unit 122 detects a phase corresponding to the optical path length between the reference surface RS and the surface TS to be measured for the wavelength of light emitted by the first light source 102, that is, each of the first reference wavelength $\lambda_1$ and second reference wavelength $\lambda_2$. The phase detection unit 124 detects a phase corresponding to the optical path length between the reference surface RS and the surface TS to be measured for the wavelength of light emitted by the second light source 104, that is, the third reference wavelength $\lambda_3$.

The processing unit 128 performs processing of obtaining the absolute distance between the reference surface RS and the surface TS to be measured by using the phases detected by the phase detection units 122 and 124 and the refractive index detected by the environment detection unit 126. The processing unit 128 controls the wavelength of light emitted by the first light source 102 and that of light emitted by the second light source 104 via the wavelength control unit 116.

Figure 5:
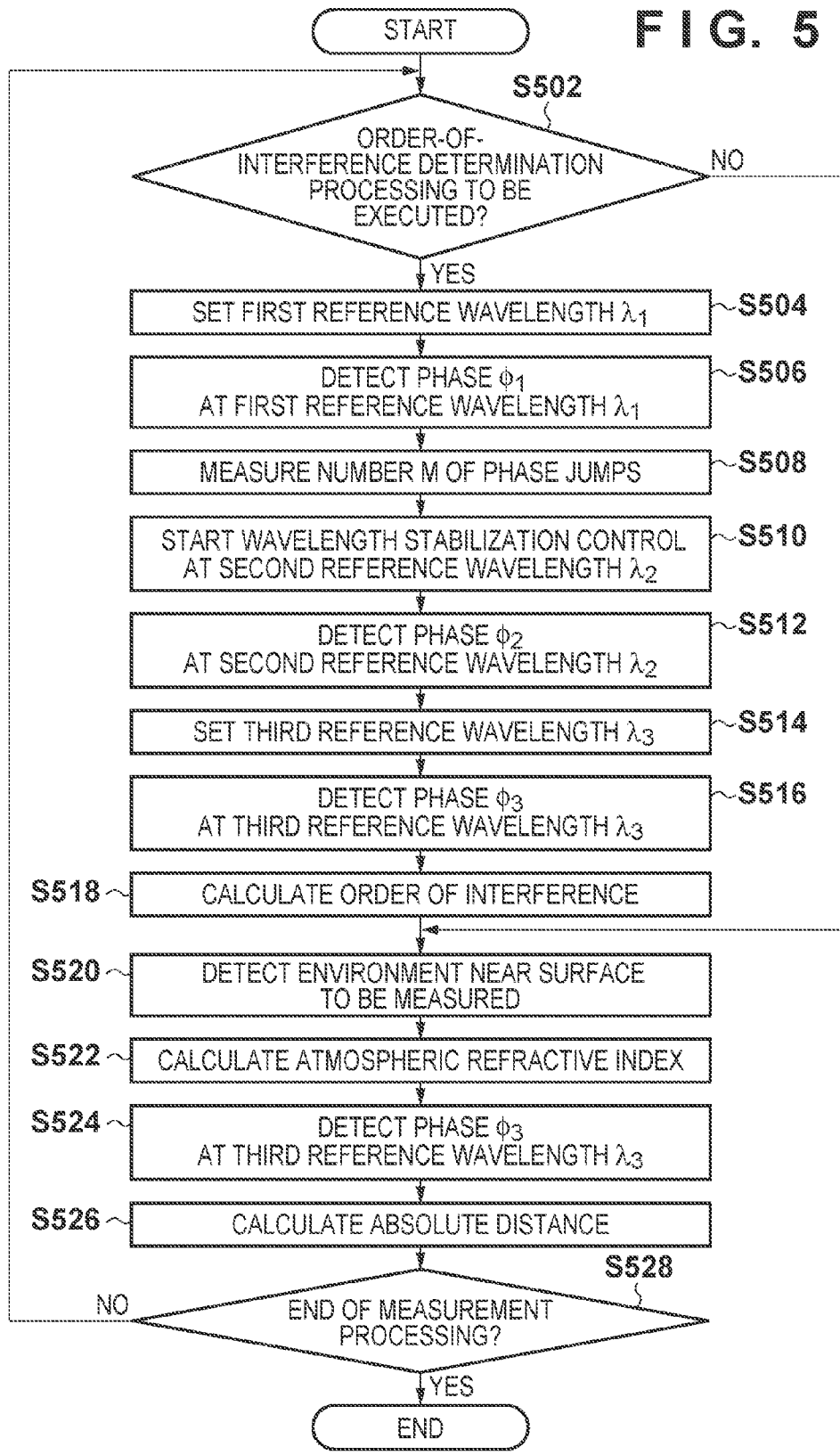
FIG. 5 is a flowchart for explaining measurement processing in the measurement apparatus shown in FIG. 4.

Measurement processing (that is, processing of obtaining the absolute distance between the reference surface RS and the surface TS to be measured by the processing unit 128) in the measurement apparatus 1A will be explained with reference to FIG. 5. The measurement processing in the measurement apparatus 1A is divided into order-of-interference determination processing in steps S502 to S518 and relative distance measurement processing in steps S520 to S526.

In step S502, it is determined whether to execute order-of-interference determination processing. For example, immediately after the start of absolute distance measurement or when the past phase detection history is lost by, for example, shielding light from the second light source 104, order-of-interference determination processing needs to be executed. Note that the processing unit 128 automatically determines whether to execute order-of-interference determination processing. If it is determined to execute order-of-interference determination processing, the process shifts to step S504. If it is determined not to execute order-of-interference determination processing, the process shifts to step S520.

Figure 6:
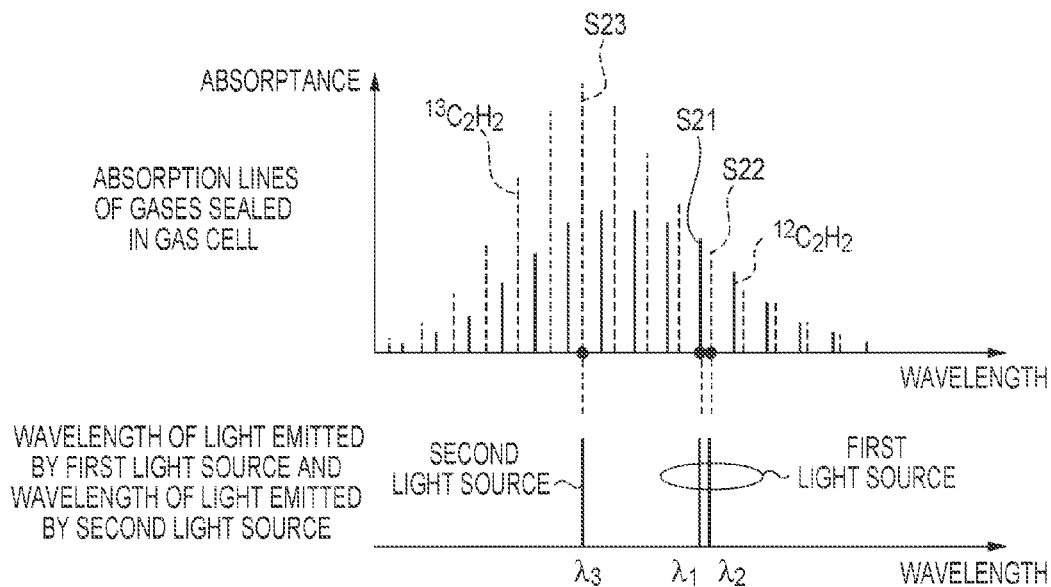
FIG. 6 is a graph showing the relationship between the absorption lines of gases sealed in a gas cell and the first to third reference wavelengths.

In step S504, the wavelength of light emitted by the first light source 102 is set to the first reference wavelength $\lambda_1$ (that is, wavelength stabilization control at the first reference wavelength $\lambda_1$ starts). In the second embodiment, as shown in FIG. 6, a wavelength corresponding to the absorption line S21 of $^{12}C_2H_2$ gas sealed in the gas cell 130 is set as the first reference wavelength $\lambda_1$, and the wavelength of light emitted by the first light source 102 is stabilized.

In step S506, a phase $\phi_1$ at the first reference wavelength $\lambda_1$ is detected. As described above, detecting a phase means detecting the phase of interference light between reference light and light to be measured. The phase $\phi_1$ at the first reference wavelength $\lambda_1$ will be explained here. L is the distance from the first light source 102 to the reference surface RS, and $2n(\lambda)D$ is the optical path difference between light to be measured and reference light. Note that $n(\lambda)$ is the refractive index of the optical path of light to be measured at the wavelength $\lambda$, and D is the absolute distance between the reference surface RS and the surface TS to be measured. In this case, a reference signal $I_{ref}$ and measurement signal $I_{test}$ are given by equations (20):

$$\begin{cases} I_{ref} = I_0 \cos\left(2\pi\left(dvt + \frac{L}{\lambda}\right)\right) \\ I_{test} = I_0 \cos\left(2\pi\left(dvt + \frac{L}{\lambda} + \frac{2n(\lambda)D}{\lambda}\right)\right) \end{cases} \quad (20)$$

Referring to equations (20), the phase $\phi_1$ at the first reference wavelength $\lambda_1$ detected in step S506 is given by equation (21):

$$\phi_1 = 2\pi \cdot \operatorname{mod}\left(\frac{2n_1 D}{\lambda_1}, 1\right) \quad (21)$$

where mod(u,k) is the remainder of the first argument u for the second argument k.

In step S508, the number of phase jumps is measured while continuously changing (scanning) the wavelength of light emitted by the first light source 102 from the first reference wavelength $\lambda_1$ to the second reference wavelength $\lambda_2$ (that is, canceling wavelength stabilization control at the first reference wavelength $\lambda_1$). In the second embodiment, as shown in FIG. 6, a wavelength corresponding to the absorption line S22 of $^{13}C_2H_2$ gas sealed in the gas cell 130 is set as the second reference wavelength $\lambda_2$.

Figure 7A:
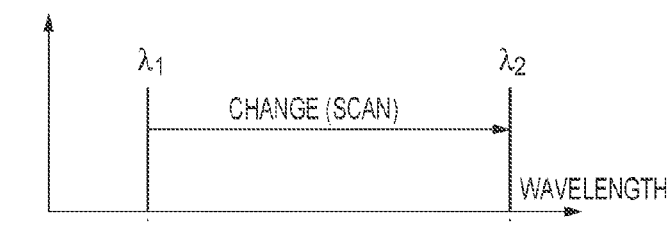
FIGS. 7A and 7B are graphs for explaining step S508 of the flowchart shown in FIG. 5.
Figure 7B:
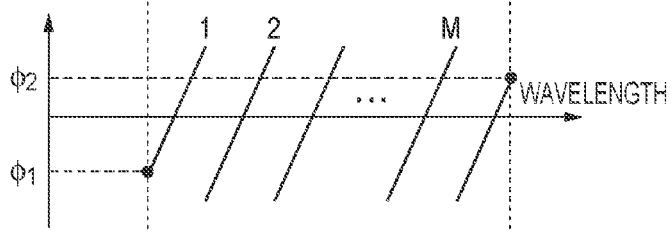

Note that step S508 can be regarded as a process of measuring a cumulative phase generated by continuously changing the wavelength from the first reference wavelength $\lambda_1$ to the second reference wavelength $\lambda_2$. As the wavelength of light emitted by the first light source 102 continuously changes from the first reference wavelength $\lambda_1$ to the second reference wavelength $\lambda_2$ (see FIG. 7A), the phase monotonously changes, as shown in FIG. 7B. Since the range of phases detectable by a phase meter is $\pm\pi$, phase jump occurs outside the range of $\pm\pi$. Measuring the cumulative phase is equivalent to counting phase jumps. The number of phase jumps measured in step S508 will be represented by M.

In step S510, when the wavelength of light emitted by the first light source 102 has changed from the first reference wavelength $\lambda_1$ to the second reference wavelength $\lambda_2$, wavelength stabilization control at the second reference wavelength $\lambda_2$ starts.

In step S512, a phase $\phi_2$ at the second reference wavelength $\lambda_2$ is detected. The phase $\phi_2$ at the second reference wavelength $\lambda_2$ detected in step S512 is given by equation (22):

$$\phi_2 = 2\pi \cdot \mathrm{mod}\left(\frac{2n_2 D}{\lambda_2}, 1\right) \quad (22)$$

where $n_2$ is the refractive index of the optical path of light to be measured at the second reference wavelength $\lambda_2$.

Referring to equations (21) and (22), the number M of phase jumps is given by equation (23):

$$M = \frac{2n_{12} D}{\Lambda_{12}} - (\phi_2 - \phi_1) \quad (23)$$

where $\Lambda_{12}$ is the synthetic wavelength of the first reference wavelength $\lambda_1$ and second reference wavelength $\lambda_2$ represented by $\lambda_1 \cdot \lambda_2 / |\lambda_2 - \lambda_1|$. As represented by equation (23), the number M of phase jumps corresponds to the order of interference of the synthetic wavelength $\Lambda_{42}$, and will be called the order M of interference of the synthetic wavelength. $n_{12}$ is the group index for the wavelengths $\lambda_1$ and $\lambda_2$.

In step S514, the wavelength of light emitted by the second light source 104 is set to the third reference wavelength $\lambda_3$ (that is, wavelength stabilization control at the third reference wavelength $\lambda_3$ starts). In the second embodiment, as shown in FIG. 6, a wavelength corresponding to the absorption line S23 of $^{13}C_2H_2$ gas sealed in the gas cell 130 is set as the third reference wavelength $\lambda_3$, and the wavelength of light emitted by the second light source 104 is stabilized.

In step S516, a phase $\phi_3$ at the third reference wavelength $\lambda_3$ is detected. The phase $\phi_3$ at the third reference wavelength $\lambda_3$ is given by equation (24):

$$\phi_3 = 2\pi \cdot \mathrm{mod}\left(\frac{2n_3 D}{\lambda_3}, 1\right) \quad (24)$$

where $n_3$ is the refractive index of the optical path of light to be measured at the third reference wavelength $\lambda_3$. $n_{13}$ is the group index for the wavelengths $\lambda_1$ and $\lambda_3$.

In step S518, the order of interference at the third reference wavelength $\lambda_3$ is calculated. Absolute distances $D_{12}$, $D_{13}$, and $D_3$ calculated from the synthetic wavelength $\Lambda_{12}$, a synthetic wavelength $\Lambda_{13}$ of the first reference wavelength $\lambda_1$ and third reference wavelength $\lambda_3$ represented by $\lambda_1 \cdot \lambda_3 / |\lambda_3 - \lambda_1|$, and the third reference wavelength $\lambda_3$ are given by equations (25), (26), and (27), respectively:

$$D_{12} = \frac{\Lambda_{12}}{2n_{12}}\left(M + \frac{\phi_2 - \phi_1}{2\pi}\right) \quad (25)$$

$$D_{13} = \frac{\Lambda_{13}}{2n_{13}}\left(M_{13} + \frac{\phi_3 - \phi_1}{2\pi}\right) \quad (26)$$

$$D_3 = \frac{\lambda_3}{2n_3}\left(N_3 + \frac{\phi_3}{2\pi}\right) \quad (27)$$

In equations (25), (26), and (27), $\lambda_3$, $\Lambda_{12}$, and $\Lambda_{13}$ have a relation of $\lambda_3 \ll \Lambda_{13} \ll \Lambda_{12}$. Thus, the orders $N_3$ and $M_{13}$ of interference are given by equations (28):

$$\begin{cases} N_3 = \mathrm{round}\left(\left(M_{13} + \frac{\phi_3 - \phi_1}{2\pi}\right)\frac{n_3 \Lambda_{13}}{n_{13}\lambda_3} - \frac{\phi_3}{2\pi}\right) \\ M_{13} = \mathrm{round}\left(\left(M + \frac{\phi_2 - \phi_1}{2\pi}\right)\frac{n_{13}\Lambda_{12}}{n_{12}\Lambda_{13}} - \frac{\phi_3 - \phi_1}{2\pi}\right) \end{cases} \quad (28)$$

Letting $d\phi$ be the phase detection accuracy, conditions to determine (calculate) the orders $N_3$ and $M_{13}$ of interference are given by inequalities (29) and (30):

$$\sqrt{2}\frac{d\phi}{2\pi}\frac{\Lambda_{13}}{\lambda_3} + \frac{2D}{\lambda_3}\frac{d\Lambda_{13}}{\Lambda_{13}} + \frac{2D}{\lambda_3}\frac{d\lambda_3}{\lambda_3} < \frac{1}{2} \quad (29)$$

$$\sqrt{2}\frac{d\phi}{2\pi}\frac{\Lambda_{12}}{\Lambda_{13}} + \frac{2D}{\Lambda_{13}}\frac{d\Lambda_{12}}{\Lambda_{12}} + \frac{2D}{\Lambda_{13}}\frac{d\Lambda_{13}}{\Lambda_{13}} < \frac{1}{2} \quad (30)$$

The conditions of the respective reference wavelengths required to satisfy inequalities (29) and (30), and details of the gas cell 130 will be explained below.

When $D=1.0$ m and $\lambda_3=1.5$ μm on the second and third terms of the left-hand side of inequality (29), $D/\lambda_3 \approx 10^6$. $d\Lambda_{13}/\Lambda_{13}$ and $d\lambda_3/\lambda_3$ can obtain $10^{-7}$ by wavelength stabilization using the absorption lines of a plurality of gases sealed in the gas cell 130. From this, the constraint condition in inequality (29) is the first term of the left-hand side.

Assuming that $d\phi/2\pi$ is about $10^{-3}$ [wave], inequality (29) can be satisfied by selecting the first reference wavelength $\lambda_1$ to set $\Lambda_{13}$ to 0.3 mm. At this time, the wavelength difference $\Delta\lambda_{13}$ between the first reference wavelength $\lambda_1$ and the third reference wavelength $\lambda_3 \approx \lambda_3^2/\Lambda_{12}$, and $\Delta\lambda_{13}=$about 7.5 nm. The wavelength difference of 7.5 nm is much larger than the interval between absorption lines (absorption line interval) of a plurality of types of gases sealed in the gas cell 130. Thus, the selectivity of the first reference wavelength $\lambda_1$ with respect to the third reference wavelength $\lambda_3$ is wide.

Under the above-described conditions, $D/\Lambda_{13}$ becomes about $10^4$ to $10^5$ in inequality (30). The constraint condition in inequality (30) is also the first term of the left-hand side. Assuming that $\Lambda_{13}$ is 0.3 mm and $d\phi/2\pi$ is about $10^{-3}$ [wave], inequality (30) can be satisfied if $\Lambda_{12}$ is about 60 mm. At this time, the wavelength difference $\Delta\lambda_{12}$ between the first reference wavelength $\lambda_1$ and the second reference wavelength $\lambda_2$ becomes about 40 pm.

The interval between absorption lines (absorption line interval) of a standard gas in the optical communication band is about 500 pm. When a gas cell filled with a single type of standard gas is used as a wavelength reference element, the wavelength difference $\Delta\lambda_{12}$ cannot be obtained. In contrast, when a gas cell filled with a plurality of types of gases is used as a wavelength reference element, the wavelength difference $\Delta\lambda_{12}$ can be obtained by selecting proper absorption lines as the absorption lines S21 and S22 from the absorption lines of these gases.

In the embodiment, a 1535.3927-nm absorption line of $^{12}C_2H_2$ gas is set as the absorption line S21. A 1535.4298-nm absorption line of $^{13}C_2H_2$ gas is set as the absorption line S22, and a 1527.8604-nm absorption line of $^{13}C_2H_2$ gas is set as the absorption line S23. At this time, $\Delta\lambda_{12}=37$ pm and $\Delta\lambda_{13}=7.5$ nm. In the embodiment, S23>S21>S22 as a result of a comparison between the intensities of the absorption lines S21, S22, and S23. From this, the partial pressure of $^{13}C_2H_2$ gas is set higher than that of $^{12}C_2H_2$ gas in the gas cell 130. The absorptances of the absorption lines S22 and S23 can be adjusted to be equal to or higher than that of the absorption line S21.

In the embodiment, $2D/\lambda_3 > 2D/\Lambda_{13}$, so $d\Lambda_{12}/\Lambda_{12}$ in inequalities (29) and (30) can be set larger than $d\lambda_3/\lambda_3$. The wavelength stability of the second reference wavelength $\lambda_2$ which determines $d\Lambda_{12}$ suffices to be lower than that of the third reference wavelength $\lambda_3$, and the absorptance of the absorption line S22 suffices to be lower than that of the absorption line S23. Instead of sealing $^{12}C_2H_2$ gas and $^{13}C_2H_2$ gas in the gas cell 130, gas cells respectively filled with $^{12}C_2H_2$ gas and $^{13}C_2H_2$ gas (a gas cell filled with $^{12}C_2H_2$ gas and a gas cell filled with $^{13}C_2H_2$ gas) may be used. When $^{12}C_2H_2$ gas and $^{13}C_2H_2$ gas are independently sealed in gas cells, the total length of the gas cells becomes longer, compared to a case in which $^{12}C_2H_2$ gas and $^{13}C_2H_2$ gas are mixed and sealed. However, finer absorptance adjustment becomes possible using the cell lengths and pressures of the respective gas cells.

Steps S520 and S522 are the same as steps S220 and S222, and a detailed description thereof will not be repeated. In step S524, the phase $\phi_2$ at the third reference wavelength $\lambda_3$ is detected.

In step S526, the absolute distance between the reference surface RS and the surface TS to be measured is calculated. More specifically, the absolute distance is calculated according to the above-described equation (27). However, after executing order-of-interference determination processing, the absolute distance is obtained in accordance with equation (31):

$$D = \frac{\lambda_3}{2n_3} \left( \text{round}\left( \frac{n_3}{n_{13}} \frac{\Lambda_{13}}{\lambda_3} \left( \text{round}\left( \frac{n_{13}}{n_{12}} \frac{2D_{12}}{\Lambda_{13}} - \frac{\phi_3 - \phi_1}{2\pi} \right) + \frac{\phi_3 - \phi_1}{2\pi} \right) - \frac{\phi_3}{2\pi} \right) + \frac{\phi_3}{2\pi} \right) \quad (31)$$

In step S528, it is determined whether to end the measurement processing (processing of obtaining the absolute distance between the reference surface RS and the surface TS to be measured). If it is determined to end the measurement processing, the measurement processing ends. If it is determined not to end the measurement processing, the process returns to step S502 to determine whether to execute order-of-interference determination processing.

As described above, the measurement apparatus 1A according to the second embodiment can measure the absolute distance between the reference surface RS and the surface TS to be measured in a wide range at high accuracy by a simple arrangement.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2010-252209 filed on Nov. 10, 2010, which is hereby incorporated by reference herein in its entirety.

What is claimed is:

1. A measurement apparatus which measures a distance between a reference surface and a surface to be measured, comprising:
a wavelength reference element configured to include a gas cell in which a plurality of types of gases having absorption lines different from each other are sealed;
a light splitting element configured to split light emitted by a light source into a first light beam and a second light beam, and cause the first light beam to enter the reference surface and the second light beam to enter the surface to be measured;
a phase detection unit configured to detect interference light between the first light beam reflected by the reference surface and the second light beam reflected by the surface to be measured, and detect, from a signal of the interference light, a phase corresponding to an optical path length between the reference surface and the surface to be measured; and
a processing unit configured to set a wavelength of light emitted by the light source to a plurality of different wavelengths corresponding to a plurality of different absorption lines by using the wavelength reference element, control the phase detection unit to detect a phase corresponding to the optical path length between the reference surface and the surface to be measured for each of the plurality of different wavelengths, and perform processing of obtaining the distance,
wherein the plurality of different wavelengths include a first reference wavelength, a second reference wavelength, a third reference wavelength, and a fourth reference wavelength,
letting $\lambda_1$ be the first reference wavelength, $\lambda_2$ be the second reference wavelength, $\lambda_3$ be the third reference wavelength, $\lambda_4$ be the fourth reference wavelength, $\phi_1$ be a phase detected by the phase detection unit at the first reference wavelength, $\phi_2$ be a phase detected by the phase detection unit at the second reference wavelength, $\phi_3$ be a phase detected by the phase detection unit at the third reference wavelength, $\phi_4$ be a phase detected by the phase detection unit at the fourth reference wavelength, $\Lambda_{12v}$ be a wavelength, in vacuum, of a synthetic wavelength of the first reference wavelength and the second reference wavelength represented by $\lambda_1 \cdot \lambda_2 / |\lambda_2 - \lambda_1|$, $\Lambda_{23v}$ be a wavelength, in vacuum, of a synthetic wavelength of the second reference wavelength and the third reference wavelength represented by $\lambda_2 \cdot \lambda_3 / |\lambda_3 - \lambda_2|$, $\Lambda_{34v}$ be a wavelength, in vacuum, of a synthetic wavelength of the third reference wavelength and the fourth reference wavelength represented by $\lambda_3 \cdot \lambda_4 / |\lambda_4 - \lambda_3|$, and $\Lambda_{4v}$ be a wavelength of the fourth reference wavelength in vacuum, the processing unit obtains a distance D in accordance with $$D = \frac{\lambda_{4v}}{2} \left( \text{round}\left( \frac{2D_{34}}{\Lambda_{4v}} - \frac{\phi_4}{2\pi} \right) + \frac{\phi_4}{2\pi} \right)$$

-continued $$D_{34} = \frac{\Lambda_{34v}}{2}\left(\text{round}\left(\frac{2D_{23}}{\Lambda_{34v}} - \frac{\phi_3 - \phi_4}{2\pi}\right) + \frac{\phi_3 - \phi_4}{2\pi}\right)$$

$$D_{23} = \frac{\Lambda_{23v}}{2}\left(\text{round}\left(\frac{2D_{12}}{\Lambda_{23v}} - \frac{\phi_2 - \phi_3}{2\pi}\right) + \frac{\phi_2 - \phi_3}{2\pi}\right)$$

$$D_{12} = \frac{\Lambda_{12v}}{4\pi}(\phi_1 - \phi_2).$$

2. A measurement apparatus which measures a distance between a reference surface and a surface to be measured, comprising:
a wavelength reference element configured to include a gas cell in which a plurality of types of gases having absorption lines different from each other are sealed;
a light splitting element configured to split light emitted by a light source into a first light beam and a second light beam, and cause the first light beam to enter the reference surface and the second light beam to enter the surface to be measured;
a phase detection unit configured to detect interference light between the first light beam reflected by the reference surface and the second light beam reflected by the surface to be measured, and detect, from a signal of the interference light, a phase corresponding to an optical path length between the reference surface and the surface to be measured; and
a processing unit configured to set a wavelength of light emitted by the light source to a plurality of different wavelengths corresponding to a plurality of different absorption lines by using the wavelength reference element, control the phase detection unit to detect a phase corresponding to the optical path length between the reference surface and the surface to be measured for each of the plurality of different wavelengths, and perform processing of obtaining the distance,
wherein the plurality of different wavelengths include a first reference wavelength, a second reference wavelength, and a third reference wavelength,
the processing unit controls the phase detection unit to detect a phase corresponding to the optical path length between the reference surface and the surface to be measured for each of the first reference wavelength, the second reference wavelength, and the third reference wavelength while continuously changing a wavelength of light emitted by the light source from the first reference wavelength to the second reference wavelength by using the wavelength reference element, and
letting $\lambda_1$ be the first reference wavelength, $\lambda_2$ be the second reference wavelength, $\lambda_3$ be the third reference wavelength, $\Phi_1$ be a phase detected by the phase detection unit at the first reference wavelength, $\Phi_2$ be a phase detected by the phase detection unit at the second reference wavelength, $\Phi_3$ be a phase detected by the phase detection unit at the third reference wavelength, M be the number of phase jumps generated upon continuously changing the wavelength of light emitted by the light source from the first reference wavelength to the second reference wavelength, $\Lambda_{12}$ be a synthetic wavelength of the first reference wavelength and the second reference wavelength represented by $\lambda_1 \cdot \lambda_2 / |\lambda_2 - \lambda_1|$, $\Lambda_{13}$ be a synthetic wavelength of the first reference wavelength and the third reference wavelength represented by $\lambda_1 \cdot \lambda_3 / |\lambda_3 - \lambda_1|$, $n_3$ be a refractive index of $\lambda_3$ in a space between the reference surface and the surface to be measured, $n_{12}$ be a group index for $\lambda_1$ and $\lambda_2$, and $n_{13}$ be a group index for $\lambda_1$ and $\lambda_3$, the processing unit obtains a distance D in accordance with $$D_1 = \frac{\Lambda_{12}}{2n_{12}}\left(M + \frac{\phi_2 - \phi_1}{2\pi}\right)$$

$$D = \frac{\lambda_3}{2n_3}\left(\text{round}\left(\frac{n_3}{n_{13}}\frac{\Lambda_{13}}{\lambda_3}\left(\text{round}\left(\frac{n_{13}}{n_{12}}\frac{2D_1}{\Lambda_{13}} - \frac{\phi_3 - \phi_1}{2\pi}\right) + \frac{\phi_3 - \phi_1}{2\pi}\right) - \frac{\phi_3}{2\pi}\right) + \frac{\phi_3}{2\pi}\right).$$

3. The apparatus according to claim 2, wherein a lower absorptance out of an absorptance of an absorption line corresponding to the first reference wavelength and an absorptance of an absorption line corresponding to the second reference wavelength is lower than an absorptance of an absorption line corresponding to the third reference wavelength.

4. The apparatus according to claim 1, wherein
the gas cell includes a first gas cell in which at least a gas having a first absorption line and a gas having a second absorption line are sealed, and a second gas cell in which at least a gas having a third absorption line is sealed, and
the first absorption line, the second absorption line, and the third absorption line satisfy a relation:
wavelength corresponding to the first absorption line<wavelength corresponding to the third absorption line<wavelength corresponding to the second absorption line.

5. The apparatus according to claim 1, wherein at least two of acetylene, an acetylene isotope, hydrogen cyanide, and a hydrogen cyanide isotope are sealed in the gas cell.

6. A measurement apparatus which measures a distance between a reference surface and a surface to be measured, comprising:
a wavelength reference element configured to include a plurality of gas cells in which a gas having an absorption line is sealed;
a light splitting element configured to split light emitted by a light source into a first light beam and a second light beam, and cause the first light beam to enter the reference surface and the second light beam to enter the surface to be measured;
a phase detection unit configured to detect interference light between the first light beam reflected by the reference surface and the second light beam reflected by the surface to be measured, and detect, from a signal of the interference light, a phase corresponding to an optical path length between the reference surface and the surface to be measured; and
a processing unit configured to set a wavelength of light emitted by the light source to a plurality of different wavelengths corresponding to a plurality of different absorption lines by using the wavelength reference element, control the phase detection unit to detect a phase corresponding to the optical path length between the reference surface and the surface to be measured for each of the plurality of different wavelengths, and perform processing of obtaining the distance,
wherein a single type of gas is sealed in each of the plurality of gas cells,
the single types of gases respectively sealed in the plurality of gas cells have absorption lines different from each other, the plurality of different wavelengths include a first reference wavelength, a second reference wavelength, and a third reference wavelength, the processing unit controls the phase detection unit to detect a phase corresponding to the optical path length between the reference surface and the surface to be measured for each of the first reference wavelength, the second reference wavelength, and the third reference wavelength while continuously changing a wavelength of light emitted by the light source from the first reference wavelength to the second reference wavelength by using the wavelength reference element, and letting $\lambda_1$ be the first reference wavelength, $\lambda_2$ be the second reference wavelength, $\lambda_3$ be the third reference wavelength, $\phi_1$ be a phase detected by the phase detection unit at the first reference wavelength, $\phi_2$ be a phase detected by the phase detection unit at the second reference wavelength, $\phi_3$ be a phase detected by the phase detection unit at the third reference wavelength, M be the number of phase lumps generated upon continuously changing the wavelength of light emitted by the light source from the first reference wavelength to the second reference wavelength, $\Lambda_{12}$ be a synthetic wavelength of the first reference wavelength and the second reference wavelength represented by $\lambda_1 \cdot \lambda_2 / |\lambda_2 - \lambda_1|$, $\Lambda_{13}$ be a synthetic wavelength of the first reference wavelength and the third reference wavelength represented by $\lambda_1 \cdot \lambda_3 / |\lambda_3 - \lambda_1|$, $n_3$ be a refractive index of $\lambda_3$ in a space between the reference surface and the surface to be measured, $n_{12}$ be a group index for $\lambda_1$ and $\lambda_2$, and $n_{13}$ be a group index for $\lambda_1$ and $\lambda_3$, the processing unit obtains a distance D in accordance with $$D_1 = \frac{\Lambda_{12}}{2n_{12}}\left(M + \frac{\phi_2 - \phi_1}{2\pi}\right)$$

$$D = \frac{\lambda_3}{2n_3}\left(\text{round}\left(\frac{n_3}{n_{13}}\frac{\Lambda_{13}}{\lambda_3}\left(\text{round}\left(\frac{n_{13}}{n_{12}}\frac{2D_1}{\Lambda_{13}} - \frac{\phi_3 - \phi_1}{2\pi}\right) + \frac{\phi_3 - \phi_1}{2\pi}\right) - \frac{\phi_3}{2\pi}\right) + \frac{\phi_3}{2\pi}\right).$$

7. The apparatus according to claim 6, wherein a lower absorptance out of an absorptance of an absorption line corresponding to the first reference wavelength and an absorptance of an absorption line corresponding to the second reference wavelength is lower than an absorptance of an absorption line corresponding to the third reference wavelength.

8. The apparatus according to claim 6, wherein at least two of acetylene, an acetylene isotope, hydrogen cyanide, and a hydrogen cyanide isotope are respectively sealed in the plurality of gas cells.

* * * * *